(12) United States Patent
Sun et al.

(10) Patent No.: US 7,936,729 B2
(45) Date of Patent: May 3, 2011

(54) DISTRIBUTION METHOD OF CHANNELIZATION CODE IN CODE DIVISION MULTIPLE ACCESS SYSTEM

(75) Inventors: Changguo Sun, Beijing (CN); Yingmin Wang, Beijing (CN); Guiliang Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 998 days.

(21) Appl. No.: 11/721,323

(22) PCT Filed: Dec. 7, 2005

(86) PCT No.: PCT/CN2005/002105
§ 371 (c)(1),
(2), (4) Date: Jun. 8, 2007

(87) PCT Pub. No.: WO2006/060958
PCT Pub. Date: Jun. 15, 2006

(65) Prior Publication Data
US 2008/0205347 A1    Aug. 28, 2008

(30) Foreign Application Priority Data
Dec. 8, 2004    (CN) .......................... 2004 1 0097009

(51) Int. Cl.
*H04W 4/00* (2009.01)
(52) U.S. Cl. ........ 370/335; 370/328; 370/329; 370/347; 370/332; 370/342; 370/436; 370/341; 370/230; 370/498; 370/471; 370/474; 455/446; 455/450; 375/146; 375/147; 375/141; 375/260; 714/752; 714/774; 714/746; 714/751; 714/779
(58) Field of Classification Search ................. 370/335, 370/336, 349, 328, 329, 347, 332, 342, 436, 370/341, 230, 498, 471, 474; 455/446, 450; 375/146, 147, 141, 260; 714/752, 774, 746, 751, 779
See application file for complete search history.

(56) References Cited

U.S. PATENT DOCUMENTS

| | | | |
|---|---|---|---|
| 7,079,570 B2 * | 7/2006 | Pan et al. ...................... | 375/147 |
| 2002/0051433 A1 * | 5/2002 | Affes et al. .................... | 370/335 |
| 2003/0123384 A1 * | 7/2003 | Agee ............................. | 370/208 |
| 2003/0224798 A1 * | 12/2003 | Willenegger et al. ......... | 455/450 |

(Continued)

*Primary Examiner* — Pierre-Louis Desir
(74) *Attorney, Agent, or Firm* — Lackenbach Siegel, LLP; Andrew F. Young (57) ABSTRACT

The invention discloses a distribution method of channelization code in code division multiple access system, which including: A. the spread spectrum codes distributed to every sector and the correlated coefficients between the spread spectrum codes distributed to every neighboring sector are calculated according to the cellular codes and the channelization codes distributed to every sector, when the network is programmed; B. every sector is divided into different regions and the edge region of every sector is formed; C. the priority of which every channelization code is at the edge region of every sector is decided according to the correlated coefficients between the spread spectrum codes distributed to every neighboring sector; D. the position information of user is real-time calculated during the operation of system, and which region the user positioned in sector is determined according to the position information; E. according to the region at which the user positioned and the decided priority of which every channelization code is at the edge region of every sector, distribute the channelization codes to every user. The method of the invention can reduce the same-frequency interference of the edge region of sector due to the correlation of the spread spectrum codes, so as to improve the communication quality of which the users are at the edge regions of the sectors.

11 Claims, 3 Drawing Sheets

U.S. PATENT DOCUMENTS

2004/0166901 A1* 8/2004 Umesh et al. .................. 455/561
2004/0192315 A1* 9/2004 Li et al. .......................... 455/447
2004/0213186 A1* 10/2004 Masuda et al. ................ 370/335
2005/0148318 A1* 7/2005 Cheng ........................... 455/405
2005/0243793 A1* 11/2005 Kim et al. ...................... 370/347
2007/0025422 A1* 2/2007 Sugisawa et al. ............. 375/141

* cited by examiner

DISTRIBUTION METHOD OF CHANNELIZATION CODE IN CODE DIVISION MULTIPLE ACCESS SYSTEM

CROSS REFERENCE TO RELATED APPLICATIONS

This application is related to, and claims priority from, Patent Cooperation Treaty (PCT) Patent Application Ser. No. PCT/CN2005/002105, filed Dec. 7, 2005, which in turn draws priority from Chinese Patent Application Ser. No. 200410097009.5, filed Dec. 8, 2004, the entire contents of each of which is incorporated herein by reference.

FIELD OF THE INVENTION

The present invention relates to a method for allocating code words in a CDMA (Code Division Multiple Access) system, in particular, to a method for allocating channelization codes in a CDMA system.

BACKGROUND OF THE INVENTION

Figure 1:
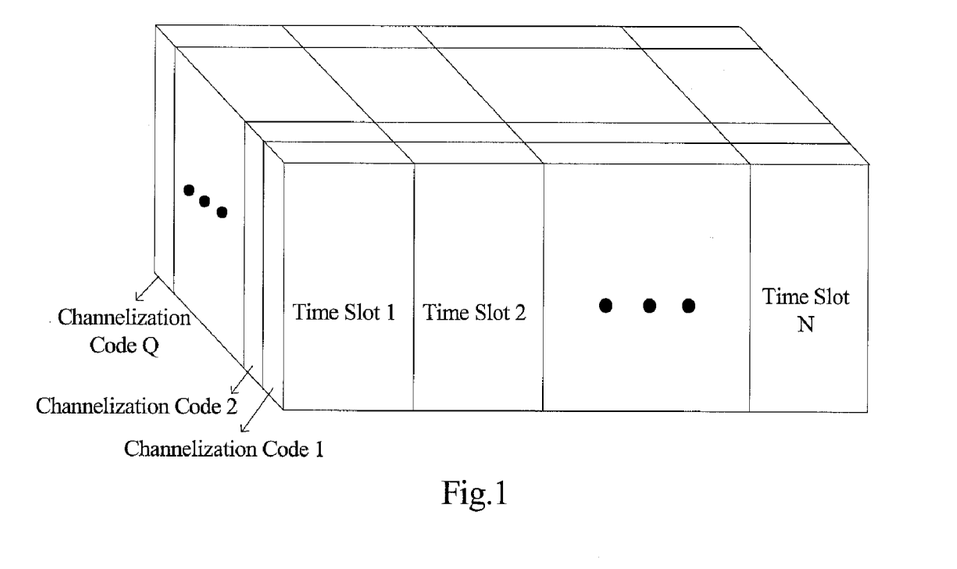
FIG. 1 is a schematic diagram of the code channel resources in a Time Slot CDMA system.

At present, the channelization codes in a CDMA system are usually allocated at random or in turn during channel allocation. For example, in a multi-sector Time Slot CDMA system employing smart antennas, the channelization codes are allocated at random or according to the sequence number of the channelization codes during channel allocation. The CDMA code resources in a multi-sector Time Slot CDMA system with smart antennas are shown in FIG. 1, which is a schematic diagram of the code channel resources in a Time Slot CDMA system. It has N allocable time slots, and each time slot has Q allocable channelization codes. The channel allocation process of the system comprises the following steps:

1. Measuring the interference power or related physical quantities of each time slot in real time.
2. Allocating a user to an optimum one of the 1 to N time slots, for example, the time slot with the minimum interference power.
3. Which channelization code of the optimum time slot occupied by the user is used at random or in turn, for example, in the order of serial number of the channelization codes from small to large: 1, 2, ..., Q.

After the channelization code is determined, the spread spectrum code of the channel is obtained by calculating the dot product of the cellization code (usually it is scrambling code) allocated during system planning and the occupied channelization code. The spread spectrum code is used for distinguishing between different channels in the same cell, and it is sent to a user along with the signaling or data. Scrambling code can change the orthogonal property of a channelization code. Since there are only 16 channelization codes in a multi-sector Time Slot CDMA system with smart antennas, strong correlativity may exist between the different spread spectrum codes of adjacent sectors, or even identical spread spectrum codes may appear. Thus, strong same-frequency interference may be introduced.

For a multi-sector system, the radio channel from a user to an adjacent sector is almost the same. As a result, the correlativity of spread spectrum codes will increase the system interference greatly. Moreover, for a system employing short spread spectrum codes, coincident spread spectrum codes may appear. In such a case, the sector edge may cause the demodulation of two users having a coincident code to fail.

SUMMARY OF THE INVENTION

Therefore, the main object of the present invention is to provide a method for allocating channelization codes in a CDMA system, so that same-frequency interference on the sector edge may be lowered.

To attain the above object, following technical solutions are provided according to the embodiments of the invention:

A method for allocating channelization codes in a CDMA system, including:

A. computing spread spectrum code allocable in each sector according to a cellization code and a channelization code that are allocated to each sector during the network planning of a CDMA system, computing the correlativity between spread spectrum codes of adjacent sectors, and obtaining a correlation coefficient between the spread spectrum codes allocable in each pair of adjacent sectors;

B. performing region division on each sector, and marking out the edge region of each sector;

C. determining the priority of each channelization code corresponding to the spread spectrum code of each adjacent sector in the edge region of each sector, according to the correlation coefficient between the spread spectrum codes allocable in each pair of adjacent sectors;

D. computing the location information of a user by the system in real time during the operation of the CDMA system, and determining to which region of the sector the user pertains according to the location information; and E. allocating a channelization code to each user by the system according to the region to which each user pertains and the priority of each channelization code in the edge region of each sector determined in step C.

Wherein, the cellization code is a scrambling code; and computing spread spectrum code allocable in each sector in step A is as follows:

obtaining the spread spectrum code allocable in each sector by bit-multiplying the allocated scrambling code of each sector with all the allocable channelization codes.

Computing the correlativity between spread spectrum codes of adjacent sectors, and obtaining a correlation coefficient between the spread spectrum codes allocable in each pair of adjacent sectors in step A is as follows:

$$\rho^{(l_1,l_2,q_1,q_2)} = \left| \frac{1}{Q} \sum_{m=1}^{Q} s^{(l_1,q_1)}(m) s^{(l_2,q_2)}(m) \right|$$

$$l_1, l_2 = 1, \ldots, L; q_1, q_2 = 1, \ldots, Q$$

Wherein, $\rho^{(l_1,l_2,q_1,q_2)}$ is the correlation coefficient; L is the number of system sectors; Q is the number of channelization codes; $S^{(l_1,q_1)}(m)$ is the spread spectrum code allocable in one of the two adjacent sectors; $S^{(l_2,q_2)}(m)$ is the spread spectrum code allocable in the other of the two adjacent sectors.

The method of performing region division on each sector in step B is as follows:

setting an edge angle threshold, wherein the region that deviates from the sector center in the left in excess of the angle threshold is referred to as the left edge region of the sector; and the region that deviates from the sector center in the right in excess of the angle threshold is referred to as the right edge region of the sector.

The step A further comprises the step of recording the obtained correlation coefficients between the spread spectrum codes allocable in each pair of adjacent sectors in a correlation coefficient table of the spread spectrum codes in the adjacent sector;

The method of determining the priority of each channelization code in the edge region of each sector in step C is as follows:

selecting channelization codes corresponding to a set of spread spectrum codes with small correlation coefficient from the correlation coefficient table of the spread spectrum codes in the adjacent sectors, and setting the priority thereof as high priority; and setting the priority of the channelization codes corresponding to a set of spread spectrum codes with large correlation coefficient as low priority.

The method of determining the priority of each channelization code in the edge region of each sector in step C may further comprise:

setting the priority of a same channelization code as different in the two edge regions of the same sector; and in the edge regions of one sector, if some channelization codes are set as high priority, then the rest channelization codes will be set as low priority.

The process of determining the priority of each channelization code in the edge region of each sector in step C may comprise:

C1. selecting two adjacent sectors from all of the sectors, and determining the adjacent edge regions of the two sectors;

C2. selecting channelization codes corresponding to a set of spread spectrum codes with small correlation coefficient from the correlation coefficient table of the spread spectrum codes in the two adjacent sectors, and setting the priorities of these channelization codes in the adjacent edge regions of the two sectors as high priority; and setting the priorities of these channelization codes in non-adjacent edge regions of the two sectors as low priority, according to the principle that the same channelization code has a high priority only in one edge region of a sector and has a low priority in the other edge region of the same sector;

C3. selecting channelization codes corresponding to a set of spread spectrum codes with large correlation coefficient from the correlation coefficient table of the spread spectrum codes in the two adjacent sectors, and setting the priorities of these channelization codes in the adjacent edge regions of the two sectors as low priority; and setting the priorities of these channelization codes in the non-adjacent edge regions of the two sectors as high priority, according to the principle that the same channelization code has a high priority only in one edge region of a sector and has a low priority in the other edge region of the same sector;

C4. selecting a sector adjacent to one of the above sectors of which the priority has been set, and determining the edge region of the selected sector, which is adjacent to the sector of which the priority has been set;

C5. according to the correlation coefficient table of the spread spectrum codes in the selected sector and the sector of which the priority has been set, and the channelization codes with high priority in the edge region in the sector of which the priority has been set, determining the channelization codes of the selected sector corresponding to the spread spectrum codes having small correlation coefficient with the spread spectrum codes corresponding to the channelization codes with high priority; setting the priorities of these channelization codes in the adjacent edge regions of the selected sector and the sector of which the priority has been set as high priority, and setting the priorities of these channelization codes in the non-adjacent edge regions of the selected sector and the sector of which the priority has been set as low priority, according to the principle that the channelization codes only have a high priority in one edge region of the sector;

C6. selecting the channelization codes corresponding to a set of spread spectrum codes with large correlation coefficient and the priority of which is not determined in step C5 from the correlation coefficient table of the spread spectrum codes in the two adjacent sectors, according to the correlation coefficient table of the spread spectrum codes in the selected sector and the sector of which the priority has been set, and setting the priorities of these channelization codes as low priority; and setting the priorities of these channelization codes in the non-adjacent edge regions of the selected sector and the sector of which the priority has been set as high priority, according to the principle that the channelization codes only have a low priority in one edge region of the sector; and C7. repeating steps C4 to C6 if there are sectors of which the priorities are not set, until the priorities of all the sectors are set.

The step C may further comprise: for the spread spectrum codes of the current sector having large correlation coefficient with the spread spectrum codes used in a common channel in adjacent sectors for sending omnidirectionally, the priorities thereof in the corresponding edge regions are set as low priority;

The step E further comprises: allocating the channelization codes corresponding to the spread spectrum codes used in the common channel according to the priority of each channelization code in the edge region of each sector.

The method of computing the location information of a user by the system in real time in step D may be as follows:

receiving an arrival wave signal sent by a user via the system and computing the power angular spectrum of the arrival wave signal, wherein the angle on which the maximum power of the arrival wave signal exists is the location information of the user;

The method of determining to which region of the sector the user pertains in step D is as follows: determining whether the angle on which the maximum power of the arrival wave signal exists is in a region that deviates from the sector center in the left in excess of an angle threshold, or in a region that deviates from the sector center in the right in excess of an angle threshold; if yes, then the user is in the left edge region or the right edge region of the sector; otherwise, the user is in the center region of the sector.

The power angular spectrum can be Bartlett-direction power spectrum.

The step D may further comprise: sequencing the users from far to near according to the distances of the users from the sector center;

In the step E, the system allocates channelization code to each user one by one according to the sequence of the users.

Specifically, the step E may comprise: allocating channelization code by the system to the user in an edge region according to the priority of each channelization code in the edge region of each sector determined in step C; and allocating channelization code to the user outside the edge region at random or according to the serial number of the channelization code.

It can be seen from above technical solutions that by using the method for allocating channelization codes in a CDMA system according to the invention, during network planning, the correlativity between the spread spectrum codes allocable in each sector may be computed according to each channelization code and the cellization code allocated to each sector, the sector region may be divided, and the priority of the channelization code in the edge region of each sector may be determined; and during channel allocation, a channelization code may be allocated to a user according to the region in which the user exists and the priority of the channelization code.

The channelization code of the user is allocated according to the priority of the channelization code, and the priority table of the channelization codes is determined according to the correlation coefficient table of the spread spectrum codes of two adjacent sectors, wherein a set of corresponding channelization codes with small correlation coefficient are selected to be set with high priority, and a set of corresponding channelization codes with large correlation coefficient are selected to be set with low priority. Therefore, by allocating channelization codes according to the above method, it can be ensured that the correlation coefficient between the spread spectrum codes generated with the channelization codes allocated according to users in adjacent edge regions of the adjacent cells is small, so that it can be ensured that the spread spectrum code interference of users in adjacent edge regions of the adjacent cells is small, and the communication quality of users can be improved.

DETAILED DESCRIPTION OF THE EMBODIMENTS

To make the objects, technical solutions and advantages of the invention more apparent, the invention will now be further illustrated in detail in conjunction with the drawings and embodiments hereinafter.

In a method for allocating channelization codes in a CDMA system according to the embodiments of the invention, the correlativity between the spread spectrum codes allocable in each sector is computed according to each channelization code and the cellization code allocated to each sector during network planning, the sector region is divided, and the priority of the channelization code in the edge region of each sector is determined, and a channelization code is allocated to a user according to the region in which the user exists and the priority of the channelization code during channel allocation.

The invention will now be illustrated in detail by taking an embodiment in which channelization codes are allocated for a three-sector system as an example.

The three-sector system of this embodiment first allocates a cellization code to each sector during network planning. In this embodiment, the cellization code is scrambling code.

Figure 2:
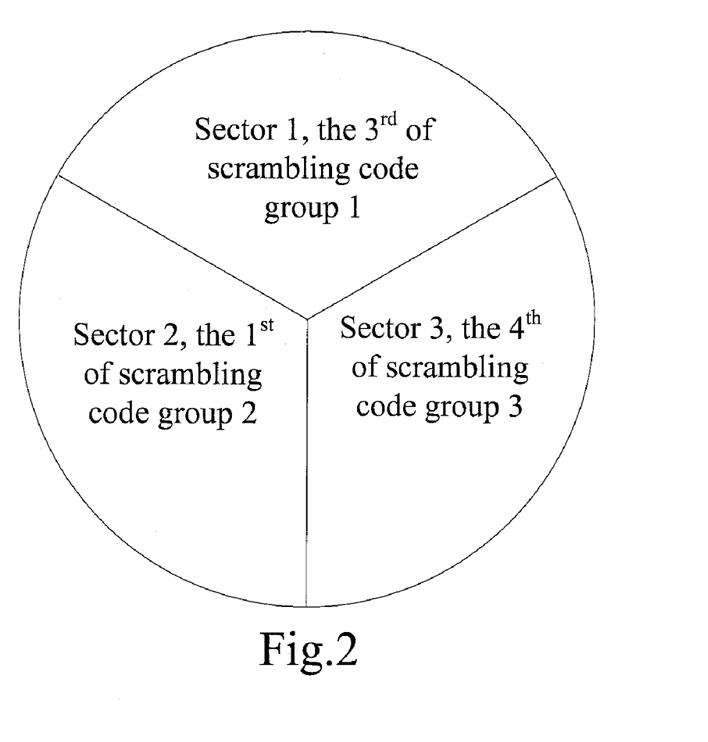
FIG. 2 is a schematic diagram of a three-sector system and the scrambling code allocating process according to an embodiment of the invention.

Referring to FIG. 2, it shows a schematic diagram of a three-sector system and the scrambling code allocating process according to one embodiment of the invention. As shown in FIG. 2, the three-sector system of this embodiment comprises sector 1, sector 2 and sector 3, wherein the scrambling code allocated to sector 1 is the $3^{rd}$ of scrambling code group 1, the scrambling code allocated to sector 2 is the $1^{st}$ of scrambling code group 2, and the scrambling code allocated to sector 3 is the $4^{th}$ of scrambling code group 3. Usually, a CDMA system has 128 scrambling codes, which are divided into 32 groups, and 4 in each group.

After the scrambling codes are allocated, 16 channelization codes and the scrambling code of each cell are computed respectively, and an optional spread spectrum code for each cell is obtained. The computing method is as follows:

It is hypothesized that the channelization code is $c^{(q)}$, q=1, ... Q, the cellization code is $r^{(l)}$, l=1, ..., L wherein l is the number of sectors. Different sectors use a different composite code obtained by bit-multiplying cellization codes with the channelization code as the spread spectrum code:

$$s^{(l,q)}(m) = r^{(l)}(m)c^{(q)}(m) \quad m=1, \ldots Q, \; q=1, \ldots, Q, \; l=1, \ldots, L \quad \text{(Formula 1)}$$

The correlation coefficient of the spread spectrum code is:

$$\rho^{(l_1, l_2, q_1, q_2)} = \left| \frac{1}{Q} \sum_{m=1}^{Q} s^{(l_1, q_1)}(m) s^{(l_2, q_2)}(m) \right| \quad \text{(Formula 2)}$$

$$l_1, l_2 = 1, \ldots, L; \; q_1, q_2 = 1, \ldots, Q$$

Wherein, $\rho^{(l_1, l_2, q_1, q_2)}$ is the correlation coefficient; L is the number of system sectors; Q is the number of channelization codes; $S^{(l_1, q_1)}(m)$ is the spread spectrum code allocable in one of the two adjacent sectors; $S^{(l_2, q_2)}(m)$ is the spread spectrum code allocable in the other of the two adjacent sectors.

For given $l_1$ and $l_2$, a correlation coefficient matrix of Q×Q is obtained, which is shown as in Table 1:

TABLE 1

| $l_1$ spread spectrum code serial number | $l_2$ spread spectrum code serial number | | | |
|---|---|---|---|---|
| | 1 | 2 | ... | Q |
| 1 | $\rho^{(l_1, l_2, 1, 1)}$ | $\rho^{(l_1, l_2, 1, 2)}$ | ... | $\rho^{(l_1, l_2, 1, Q)}$ |
| 2 | $\rho^{(l_1, l_2, 2, 1)}$ | $\rho^{(l_1, l_2, 2, 2)}$ | ... | $\rho^{(l_1, l_2, 2, Q)}$ |
| . | . | . | . | . |
| . | . | . | . | . |
| . | . | . | . | . |
| Q | $\rho^{(l_1, l_2, Q, 1)}$ | $\rho^{(l_1, l_2, Q, 2)}$ | ... | $\rho^{(l_1, l_2, Q, Q)}$ |

According to this matrix, correlation coefficient tables among the three sectors of the system shown in FIG. 2 can be obtained, as shown in Table 2-1, Table 2-2 and Table 2-3 respectively:

Table 2-1 is the correlation coefficient table of spread spectrum codes corresponding to sector 1 and sector 2. Wherein, the first row is the serial number of the spread spectrum codes in sector 1, the first column is the serial number of the spread spectrum codes in sector 2, and other values are the correlation coefficients of the spread spectrum codes corresponding to sector 1 and sector 2.

TABLE 2-1

| ρ | s1 | s2 | s3 | S4 | s5 | s6 | s7 | s8 | s9 | s10 | s11 | s12 | s13 | s14 | s15 | s16 |
|---|---|---|---|---|---|---|---|---|---|---|---|---|---|---|---|---|
| s1 | 0 | 0 | 0 | 0 | 0 | 0 | 0 | 0 | 0 | 0 | 0.5 | 0.5 | 0 | 0 | 0.5 | 0.5 |
| s2 | 0 | 0 | 0 | 0 | 0 | 0 | 0 | 0 | 0 | 0 | 0.5 | 0.5 | 0 | 0 | 0.5 | 0.5 |
| s3 | 0 | 0 | 0 | 0 | 0 | 0 | 0 | 0 | 0.5 | 0.5 | 0 | 0 | 0.5 | 0.5 | 0 | 0 |
| s4 | 0 | 0 | 0 | 0 | 0 | 0 | 0 | 0 | 0.5 | 0.5 | 0 | 0 | 0.5 | 0.5 | 0 | 0 |
| s5 | 0 | 0 | 0 | 0 | 0 | 0 | 0 | 0 | 0 | 0 | 0.5 | 0.5 | 0 | 0 | 0.5 | 0.5 |
| s6 | 0 | 0 | 0 | 0 | 0 | 0 | 0 | 0 | 0 | 0 | 0.5 | 0.5 | 0 | 0 | 0.5 | 0.5 |
| s7 | 0 | 0 | 0 | 0 | 0 | 0 | 0 | 0 | 0.5 | 0.5 | 0 | 0 | 0.5 | 0.5 | 0 | 0 |
| s8 | 0 | 0 | 0 | 0 | 0 | 0 | 0 | 0 | 0.5 | 0.5 | 0 | 0 | 0.5 | 0.5 | 0 | 0 |
| s9 | 0 | 0 | 0.5 | 0.5 | 0 | 0 | 0.5 | 0.5 | 0 | 0 | 0 | 0 | 0 | 0 | 0 | 0 |
| s10 | 0 | 0 | 0.5 | 0.5 | 0 | 0 | 0.5 | 0.5 | 0 | 0 | 0 | 0 | 0 | 0 | 0 | 0 |
| s11 | 0.5 | 0.5 | 0 | 0 | 0.5 | 0.5 | 0 | 0 | 0 | 0 | 0 | 0 | 0 | 0 | 0 | 0 |
| s12 | 0.5 | 0.5 | 0 | 0 | 0.5 | 0.5 | 0 | 0 | 0 | 0 | 0 | 0 | 0 | 0 | 0 | 0 |
| s13 | 0 | 0 | 0.5 | 0.5 | 0 | 0 | 0.5 | 0.5 | 0 | 0 | 0 | 0 | 0 | 0 | 0 | 0 |
| s14 | 0 | 0 | 0.5 | 0.5 | 0 | 0 | 0.5 | 0.5 | 0 | 0 | 0 | 0 | 0 | 0 | 0 | 0 |
| s15 | 0.5 | 0.5 | 0 | 0 | 0.5 | 0.5 | 0 | 0 | 0 | 0 | 0 | 0 | 0 | 0 | 0 | 0 |
| s16 | 0.5 | 0.5 | 0 | 0 | 0.5 | 0.5 | 0 | 0 | 0 | 0 | 0 | 0 | 0 | 0 | 0 | 0 |

Table 2-2 is the correlation coefficient table of the spread spectrum codes corresponding to sector 1 and sector 3. Wherein, the first row is the serial number of the spread spectrum codes in sector 1, the first column is the serial number of the spread spectrum codes in sector 3, and other values are the correlation coefficients of the spread spectrum codes corresponding to sector 1 and sector 3.

Table 2-3 is the correlation coefficient table of the spread spectrum codes corresponding to sector 2 and sector 3. Wherein, the first row is the serial number of the spread spectrum codes in sector 2, the first column is the serial number of the spread spectrum codes in sector 3, and other values are the correlation coefficients of the spread spectrum codes corresponding to sector 2 and sector 3.

TABLE 2-2

| ρ | s1 | s2 | s3 | S4 | s5 | s6 | s7 | s8 | s9 | s10 | s11 | s12 | s13 | s14 | s15 | s16 |
|---|---|---|---|---|---|---|---|---|---|---|---|---|---|---|---|---|
| s1 | 0 | 0 | 0 | 0 | 0 | 0 | 0 | 1 | 0 | 0 | 0 | 0 | 0 | 0 | 0 | 0 |
| s2 | 0 | 0 | 0 | 0 | 0 | 0 | 1 | 0 | 0 | 0 | 0 | 0 | 0 | 0 | 0 | 0 |
| s3 | 0 | 0 | 0 | 0 | 0 | 1 | 0 | 0 | 0 | 0 | 0 | 0 | 0 | 0 | 0 | 0 |
| s4 | 0 | 0 | 0 | 0 | 1 | 0 | 0 | 0 | 0 | 0 | 0 | 0 | 0 | 0 | 0 | 0 |
| s5 | 0 | 0 | 0 | 1 | 0 | 0 | 0 | 0 | 0 | 0 | 0 | 0 | 0 | 0 | 0 | 0 |
| s6 | 0 | 0 | 1 | 0 | 0 | 0 | 0 | 0 | 0 | 0 | 0 | 0 | 0 | 0 | 0 | 0 |
| s7 | 0 | 1 | 0 | 0 | 0 | 0 | 0 | 0 | 0 | 0 | 0 | 0 | 0 | 0 | 0 | 0 |
| s8 | 1 | 0 | 0 | 0 | 0 | 0 | 0 | 0 | 0 | 0 | 0 | 0 | 0 | 0 | 0 | 0 |
| s9 | 0 | 0 | 0 | 0 | 0 | 0 | 0 | 0 | 0 | 0 | 0 | 0 | 0 | 0 | 0 | 1 |
| s10 | 0 | 0 | 0 | 0 | 0 | 0 | 0 | 0 | 0 | 0 | 0 | 0 | 0 | 0 | 1 | 0 |
| s11 | 0 | 0 | 0 | 0 | 0 | 0 | 0 | 0 | 0 | 0 | 0 | 0 | 0 | 1 | 0 | 0 |
| s12 | 0 | 0 | 0 | 0 | 0 | 0 | 0 | 0 | 0 | 0 | 0 | 0 | 1 | 0 | 0 | 0 |
| s13 | 0 | 0 | 0 | 0 | 0 | 0 | 0 | 0 | 0 | 0 | 0 | 1 | 0 | 0 | 0 | 0 |
| s14 | 0 | 0 | 0 | 0 | 0 | 0 | 0 | 0 | 0 | 0 | 1 | 0 | 0 | 0 | 0 | 0 |
| s15 | 0 | 0 | 0 | 0 | 0 | 0 | 0 | 0 | 1 | 0 | 0 | 0 | 0 | 0 | 0 | 0 |
| s16 | 0 | 0 | 0 | 0 | 0 | 0 | 0 | 0 | 1 | 0 | 0 | 0 | 0 | 0 | 0 | 0 |

TABLE 2-3

| ρ | s1 | s2 | s3 | S4 | s5 | s6 | s7 | s8 | s9 | s10 | s11 | s12 | s13 | s14 | s15 | s16 |
|---|---|---|---|---|---|---|---|---|---|---|---|---|---|---|---|---|
| s1 | 0 | 0 | 0 | 0 | 0 | 0 | 0 | 0 | 0.5 | 0.5 | 0 | 0 | 0.5 | 0.5 | 0 | 0 |
| s2 | 0 | 0 | 0 | 0 | 0 | 0 | 0 | 0 | 0.5 | 0.5 | 0 | 0 | 0.5 | 0.5 | 0 | 0 |
| s3 | 0 | 0 | 0 | 0 | 0 | 0 | 0 | 0 | 0 | 0 | 0.5 | 0.5 | 0 | 0 | 0.5 | 0.5 |
| s4 | 0 | 0 | 0 | 0 | 0 | 0 | 0 | 0 | 0 | 0 | 0.5 | 0.5 | 0 | 0 | 0.5 | 0.5 |
| s5 | 0 | 0 | 0 | 0 | 0 | 0 | 0 | 0 | 0.5 | 0.5 | 0 | 0 | 0.5 | 0.5 | 0 | 0 |
| s6 | 0 | 0 | 0 | 0 | 0 | 0 | 0 | 0 | 0.5 | 0.5 | 0 | 0 | 0.5 | 0.5 | 0 | 0 |
| s7 | 0 | 0 | 0 | 0 | 0 | 0 | 0 | 0 | 0 | 0 | 0.5 | 0.5 | 0 | 0 | 0.5 | 0.5 |
| s8 | 0 | 0 | 0 | 0 | 0 | 0 | 0 | 0 | 0 | 0 | 0.5 | 0.5 | 0 | 0 | 0.5 | 0.5 |
| s9 | 0.5 | 0.5 | 0 | 0 | 0.5 | 0.5 | 0 | 0 | 0 | 0 | 0 | 0 | 0 | 0 | 0 | 0 |
| s10 | 0.5 | 0.5 | 0 | 0 | 0.5 | 0.5 | 0 | 0 | 0 | 0 | 0 | 0 | 0 | 0 | 0 | 0 |
| s11 | 0 | 0 | 0.5 | 0.5 | 0 | 0 | 0.5 | 0.5 | 0 | 0 | 0 | 0 | 0 | 0 | 0 | 0 |
| s12 | 0 | 0 | 0.5 | 0.5 | 0 | 0 | 0.5 | 0.5 | 0 | 0 | 0 | 0 | 0 | 0 | 0 | 0 |
| s13 | 0.5 | 0.5 | 0 | 0 | 0.5 | 0.5 | 0 | 0 | 0 | 0 | 0 | 0 | 0 | 0 | 0 | 0 |
| s14 | 0.5 | 0.5 | 0 | 0 | 0.5 | 0.5 | 0 | 0 | 0 | 0 | 0 | 0 | 0 | 0 | 0 | 0 |
| s15 | 0 | 0 | 0.5 | 0.5 | 0 | 0 | 0.5 | 0.5 | 0 | 0 | 0 | 0 | 0 | 0 | 0 | 0 |
| s16 | 0 | 0 | 0.5 | 0.5 | 0 | 0 | 0.5 | 0.5 | 0 | 0 | 0 | 0 | 0 | 0 | 0 | 0 |

During system planning, the sector regions are also divided, and the priority of the channelization code in the edge region of each sector is determined.

Figure 3:
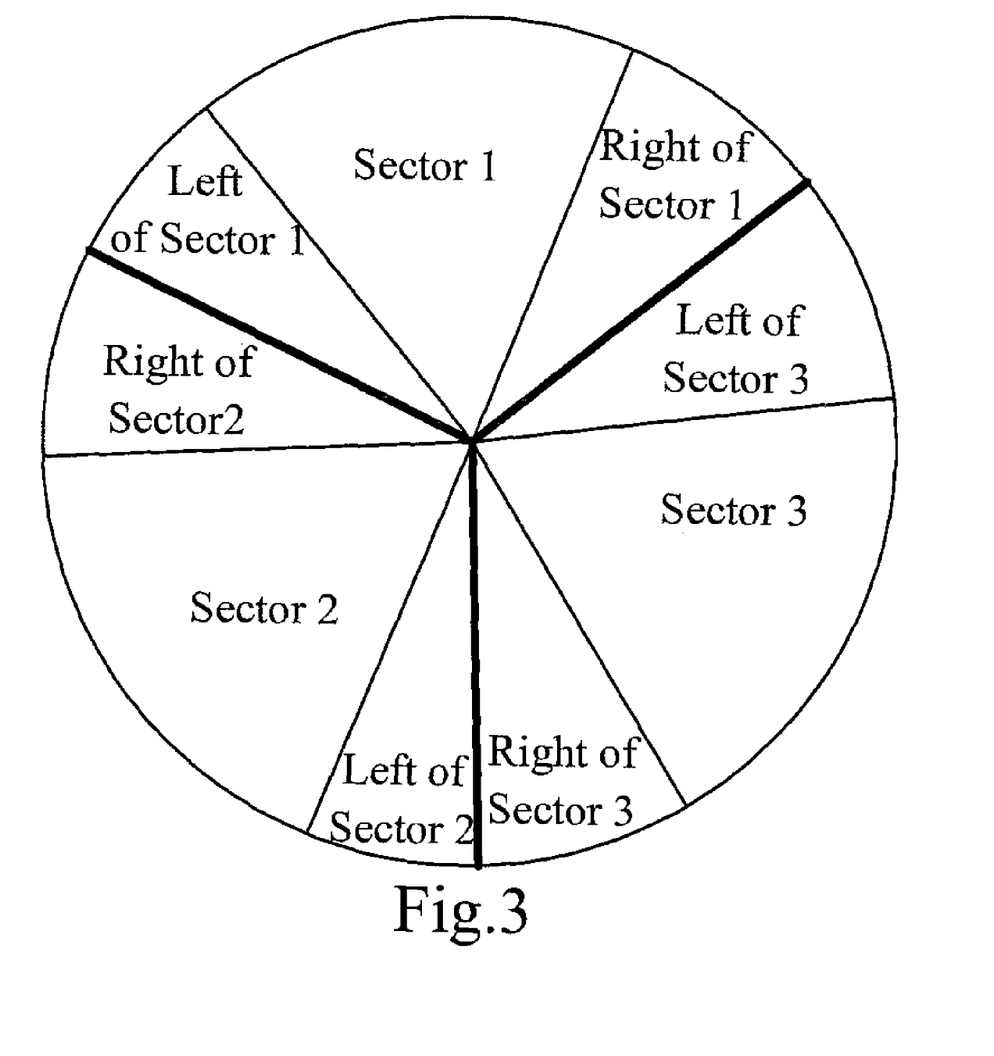
FIG. 3 is a schematic diagram of sector region division according to the method of the invention.

In this embodiment, each sector is divided into three regions. Referring to FIG. 3, it shows a schematic diagram of sector region division according to the method of the invention. Wherein, each sector is divided into a central sector region, a left sector edge region and a right sector edge region.

The dividing method is as follows: the region that deviates from the sector center in the left in an angle larger than a certain threshold angle is referred to as left sector edge region; the region that deviates from the sector center in the right in an angle larger than the threshold angle is referred to as right sector edge region; and the central sector region is a region within the threshold angle. In this embodiment, the threshold angle $\phi_0$ can be set as 30°.

Thus, the priority of the channelization code in the edge region of each sector can be determined according to the sector region and the above correlation coefficient tables of the spread spectrum codes between the sectors. There are 3 points in the principle for determining the priority of the channelization code:

1. For some spread spectrum codes with small correlation coefficient in two adjacent sectors, the priorities of the channelization codes corresponding to these spread spectrum codes are set as high priority 1 in the adjacent edge regions of the two cells.

2. For some spread spectrum codes with large correlation coefficient in two adjacent sectors, the priorities of the channelization codes corresponding to these spread spectrum codes are set as low priority −1 in the adjacent edge regions of the two sectors.

3. For some spread spectrum codes of the current sector which have large correlation coefficient with the spread spectrum codes used in a common channel in the adjacent sectors for transmitting omnidirectionally, the priorities of the channelization codes corresponding to these spread spectrum codes are set as low priority −1 in the adjacent edge regions of the two sectors. Here, the spread spectrum codes of the current sector may be spread spectrum codes used in the common channel, or user spread spectrum codes.

The generation and allocation of the spread spectrum codes used in the common channel are the same as those of the user spread spectrum codes, except that the sending modes are different: the spread spectrum codes used in the common channel are sent to all the regions of the sector, i.e., sent omnidirectionally; while the spread spectrum codes used by a user is sent to the user according to the location of the user in the sector, but not omnidirectionally.

In practical application, the process for determining the priority of each channelization code in the edge region of each sector may comprise:

C1. selecting two adjacent sectors from all of the sectors, and determining the adjacent edge regions of the two sectors;

C2. selecting channelization codes corresponding to a set of spread spectrum codes with small correlation coefficient from the correlation coefficient table of the spread spectrum codes in the two adjacent sectors, and setting the priorities of these channelization codes in the adjacent edge regions of the two sectors as high priority; and setting the priorities of these channelization codes in non-adjacent edge regions of the two sectors as low priority, according to the principle that the channelization code has a high priority only in one edge region of a sector;

C3. selecting channelization codes corresponding to a set of spread spectrum codes with large correlation coefficient from the correlation coefficient table of the spread spectrum codes in the two adjacent sectors, and setting the priorities of these channelization codes in the adjacent edge regions of the two sectors as low priority; and setting the priorities of these channelization codes in the non-adjacent edge regions of the two sectors as high priority, according to the principle that the channelization code has a high priority only in one edge region of a sector;

C4. selecting a sector adjacent to one of the above sectors of which the priority has been set, and determining the edge region of the selected sector, which is adjacent to the sector of which the priority has been set;

C5. according to the correlation coefficient table of the spread spectrum codes in the selected sector and the sector of which the priority has been set, and the channelization codes with high priority in the edge region in the sector of which the priority has been set, determining the channelization codes of the selected sector corresponding to the spread spectrum codes having small correlation coefficient with the spread spectrum codes corresponding to the channelization codes with high priority; setting the priorities of these channelization codes in the adjacent edge regions of the selected sector and the sector of which the priority has been set as high priority, and setting the priorities of these channelization codes in the non-adjacent edge regions of the selected sector and the sector of which the priority has been set as low priority, according to the principle that the channelization codes only have a high priority in one edge region of the sector;

C6. selecting the channelization codes corresponding to a set of spread spectrum codes with large correlation coefficient and the priority of which is not determined in step C5 from the correlation coefficient table of the spread spectrum codes in the two adjacent sectors, according to the correlation coefficient table of the spread spectrum codes in the selected sector and the sector of which the priority has been set, and setting the priorities of these channelization codes as low priority; and setting the priorities of these channelization codes in the non-adjacent edge regions of the selected sector and the sector of which the priority has been set as high priority, according to the principle that the channelization codes only have a low priority in one edge region of the sector; and C7. repeating steps C4 to C6 if there are sectors of which the priorities are not set, until the priorities of all the sectors are set.

In this embodiment, the priorities of the sector edge regions are recorded in a channelization code priority table. Specifically, the channelization code priority table is generated in the following steps; and in practical application, the method for generating a priority table may vary as required:

Step 1: performing the above steps C1 to C3 at first, so that the priority of each channelization code in the adjacent edge regions of sector 1 and sector 2 can be determined, that is, the priority in the left edge region of sector 1 and the priority in the right edge region of sector 2 can be determined; selecting the channelization codes corresponding to a set of spread spectrum codes with small correlation coefficient from correlation coefficient table 2-1 of the spread spectrum codes in sector 1 and sector 2, and setting the priority thereof as high priority, identified by 1; and setting the priority of the channelization codes corresponding to a set of spread spectrum codes with large correlation coefficient as low priority, identified by −1.

The degree of small correlation coefficient will be determined according to practical situations. In this embodiment, the priority of the channelization codes corresponding to the spread spectrum codes with a correlation coefficient of 0 selected by the adjacent sector in the adjacent edge regions is 1.

It can be seen from Table 2-1 that there are two groups of channelization codes corresponding to the spread spectrum codes with small correlation coefficient between sector 1 and sector 2: channelization codes 1-8 in sector 1 and channelization codes 1-8 in sector 2; and channelization codes 9-16 in sector 1 and channelization codes 9-16 in sector 2. There are also two groups of channelization codes corresponding to the spread spectrum codes with large correlation coefficient between sector 1 and sector 2: channelization codes 1-8 in sector 1 and channelization codes 9-16 in sector 2; and channelization codes 9-16 in sector 1 and channelization codes 1-8 in sector 2.

In this embodiment, the first group of the channelization codes corresponding to the spread spectrum codes with small correlation coefficient in sector 1 and sector 2 is selected, and the priority thereof is set as 1; the second group of the channelization codes corresponding to the spread spectrum codes with large correlation coefficient in sector 1 and sector 2 is selected, and the priority thereof is set as −1. In this embodiment, the adjacent regions of sector 1 and sector 2 are the left edge region of sector 1 and the right edge region of sector 2. Thus, the priorities of channelization codes 1-8 in the left edge region of sector 1 and the right edge region of sector 2 are set as 1.

In the same sector, the following principle may be employed to determine the priority of the same channelization code in different regions:

If some channelization codes have high priorities in one edge region, then the priorities of these channelization codes in the other edge region will be low. Thus, in sector 1, if channelization codes 1-8 have high priorities in the left edge region, then the priorities of these channelization codes in the right edge region will be low. Therefore, the priorities of channelization codes 1-8 in the right edge region of sector 1 are −1.

There exists another principle: if some channelization codes have high priorities in one edge region, then the priorities of the rest channelization codes in the edge region will be low. For example, if the priorities of channelization codes 1-8 in the right edge region of sector 2 are set as 1, then the priorities of the rest channelization codes 9-16 are set as −1 in the right edge region of sector 2. In sector 2, since the priorities of channelization codes 9-16 in the right edge region are set as −1, the priorities of channelization codes 9-16 in the left edge region will be set as 1. Thus, the priorities of the 16 channelization codes in the edge regions of sector 1 and sector 2 are determined respectively:

In sector 1, the priorities of channelization codes 1-8 in the left edge region are 1, and the priorities in the right edge region are −1; the priorities of channelization codes 9-16 in the left edge region are −1, and the priorities in the right edge region are 1.

In sector 2, the priorities of channelization codes 1-8 in the left edge region are −1, and the priorities in the right edge region are 1; the priorities of channelization codes 9-16 in the left edge region are 1, and the priorities in the right edge region are −1.

Step 2: Performing the above steps C4-C6, and setting the priorities of the channelization codes selected for the two edge regions of sector 3 which have small correlation coefficient with the channelization codes selected for sectors 1 and 2 as 1, and setting the priorities of the channelization codes with large correlation coefficient as −1, according to the correlation coefficient table of spread spectrum codes in sectors 1 and 3 or sectors 2 and 3, and the channelization codes with a priority of 1 determined in sectors 1 and 2.

In this embodiment, there are two methods for determining the priorities of the 16 channelization codes in the two edge regions of sector 3:

The first method: setting according to the correlation coefficient table of spread spectrum codes in sectors 1 and 3. In this embodiment, the right edge region of sector 1 is adjacent to the left edge region of sector 3. It can be seen from the correlation coefficient table of spread spectrum codes in sectors 1 and 3, i.e., Table 2-2, that there are two groups of channelization codes corresponding to the spread spectrum codes with small correlation coefficient in sector 1 and sector 3: channelization codes 9-16 in sector 1 and channelization codes 1-8 in sector 3; and channelization codes 1-8 in sector 1 and channelization codes 9-16 in sector 3. There are two groups of channelization codes corresponding to the spread spectrum codes with large correlation coefficient in sector 1 and sector 3: channelization codes 1-8 in sector 1 and channelization codes 1-8 in sector 3; and channelization codes 9-16 in sector 1 and channelization codes 9-16 in sector 3.

In this embodiment, since the priorities of channelization codes 9-16 in the right edge region of sector 1 are 1, and correspondingly, the channelization codes corresponding to the spread spectrum codes with small correlation coefficient are channelization codes 1-8 in sector 3, the priorities of channelization codes 1-8 in the left edge region of sector 3 are set as 1, and the priorities of channelization codes 1-8 in the right edge region of sector 3 are set as −1. Since the priorities of channelization codes 1-8 in the left edge region of sector 3 are set as 1, it is determined according to the second group of channelization codes corresponding to the spread spectrum codes with large correlation coefficient in sector 1 and sector 3 that the priorities of channelization codes 9-16 in the left edge region of sector 3 are −1, and the priorities in the right edge region of sector 3 are 1.

The second method: setting according to the correlation coefficient table of spread spectrum codes in sectors 2 and 3. In this embodiment, since the left edge region of sector 2 is adjacent to the right edge region of sector 3, It can be seen from the correlation coefficient table of spread spectrum codes in sectors 2 and 3, i.e., Table 2-3, that there are two groups of channelization codes corresponding to the spread spectrum codes with small correlation coefficient in sector 2 and sector 3: channelization codes 1-8 in sector 2 and channelization codes 1-8 in sector 3; and channelization codes 9-16 in sector 2 and channelization codes 9-16 in sector 3. There are two groups of channelization codes corresponding to the spread spectrum codes with large correlation coefficient in sector 2 and sector 3: channelization codes 9-16 in sector 2 and channelization codes 1-8 in sector 3; and channelization codes 1-8 in sector 2 and channelization codes 9-16 in sector 3.

In this embodiment, since the priorities of channelization codes 9-16 in the left edge region of sector 2 are 1, and correspondingly, the channelization codes corresponding to the spread spectrum codes with small correlation coefficient are channelization codes 9-16 in sector 3, the priorities of channelization codes 9-16 in the right edge region of sector 3 are set as 1, and the priorities of channelization codes 9-16 in the left edge region of sector 3 are set as −1. Since the priorities of channelization codes 9-16 in the right edge region of sector 3 are set as 1, it is determined according to the first group of channelization codes corresponding to the spread spectrum codes with large correlation coefficient in sector 2 and sector 3 that the priorities of channelization codes 1-8 in the right edge region of sector 3 are −1, and the priorities in the left edge region of sector 3 are 1.

Since there are only three sectors in the system of this embodiment, the above step C7 does not need to be performed. If the system has more than three sectors, then repeat steps C4 to C6 until the priorities of all the sectors are set.

According to the above method, the priority table of channelization codes shown in Table 3 may be obtained in this embodiment. The priorities in this embodiment are shown as in Table 3.

In practice, all of the correlation coefficients may be the same. In such a case, the priorities are 0.

Additionally, for the channelization codes with high priority selected in a certain region, if the spread spectrum codes corresponding to the channelization codes have large correlation coefficient with the spread spectrum codes in a common channel for omnidirectionally transmitting in the corresponding adjacent sectors, the priorities of these channelization codes are set as −1.

In the present embodiment, the priorities of the adjacent edge regions in sector 1 and sector 2 are determined at first; but in practical application, the priorities of the adjacent edge regions of sector 1 and sector 3, sector 2 and sector 3, etc., can be determined first.

Figure 4:
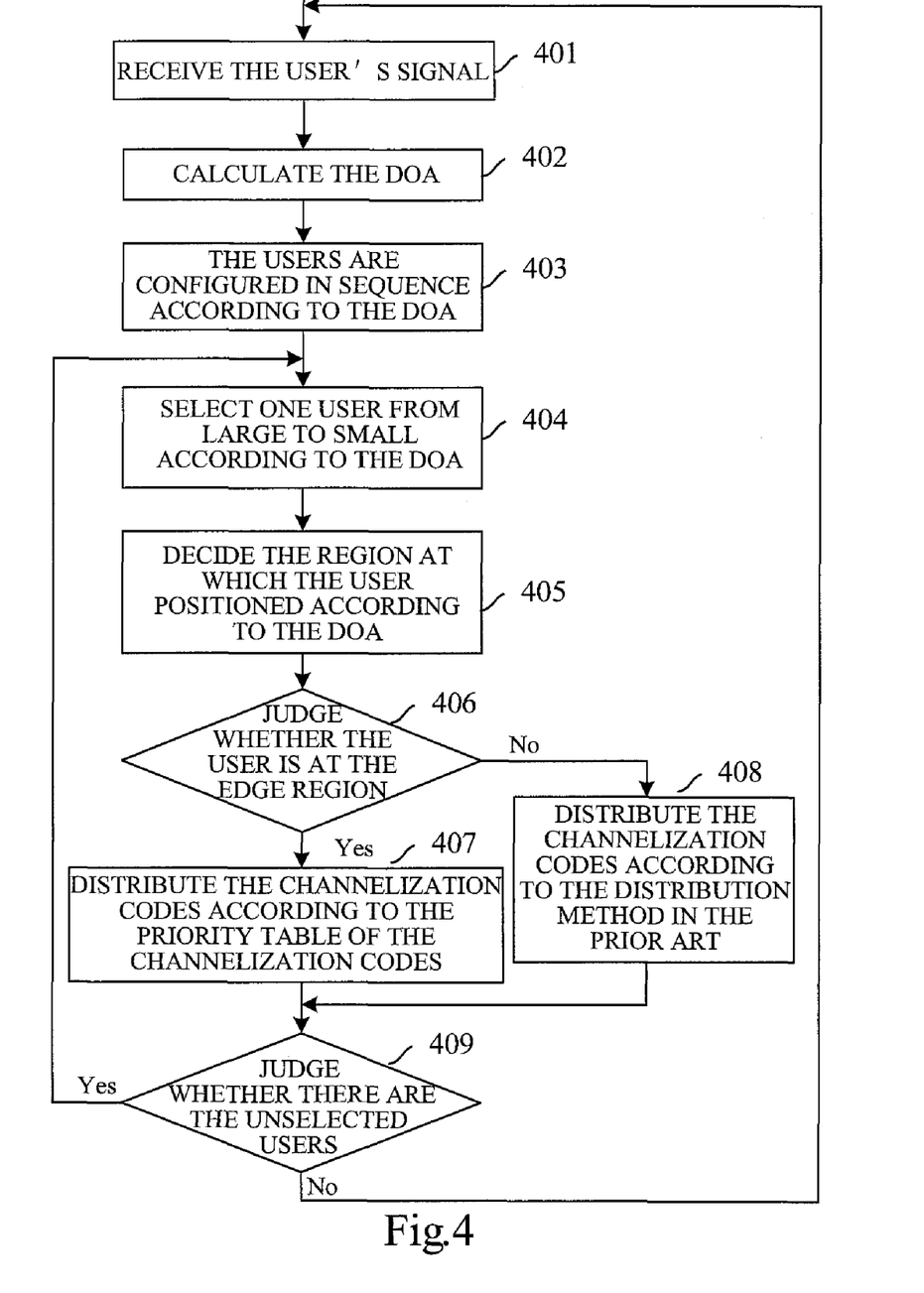
FIG. 4 is a schematic flow chart of channelization code allocation in the system according to the embodiment shown in FIG. 3.

Therefore, a channelization code can be allocated to a user according to the region in which the user exists and the priority of the channelization code during channel allocation. The allocating process is show in FIG. 4, which is a schematic flow chart of channelization code allocation in the system according to the embodiment shown in FIG. 3. The process comprises the following steps:

Step 401: Receiving an arrival wave signal from a user.

Step 402: Computing the DOA (direction Of Arrival wave) of the user.

The system computes the power angular spectrum of the arrival wave signal, wherein the angle on which the maximum power of the arrival wave signal exists is the DOA of the user, i.e., the location information of the user.

The DOA may be the angle on which the maximum value of the arrival wave signal exists in Bartlett-direction power spectrum. For example, the Bartlett-direction power spectrum of the $k^{th}$ user is:

$$P_B^{(k)}(\varphi) = \frac{a^H(\varphi) R_{xx}^{(k)} a(\varphi)}{a^H(\varphi) a(\varphi)} \quad \text{(Formula 3)}$$

$$P_{max}^{(k)} = \max(P_B^{(k)}(\varphi)) \quad \text{(Formula 4)}$$

Wherein, $a(\phi)$ is the array response vector in direction $\phi$ of an antenna array, $R_{xx}^{(k)}$ is the spatial correlation matrix of the $k^{th}$ user obtained by estimation according to the channel of the user.

Thus, the DOA of the $k^{th}$ user is:

$$\phi^{(k)} = \phi | p_B^{(k)}(\phi) = p_{max}^{(k)} \quad \text{(Formula 5)}$$

TABLE 3

| Sector | Channelization code order | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| | Priorities | | | | | | | | | | | | | | | |
| 1 LEFT EDGE REGION | 1 | 1 | 1 | 1 | 1 | 1 | 1 | 1 | −1 | −1 | −1 | −1 | −1 | −1 | −1 | −1 |
| RIGHT EDGE REGION | −1 | −1 | −1 | −1 | −1 | −1 | −1 | −1 | 1 | 1 | 1 | 1 | 1 | 1 | 1 | 1 |
| 2 LEFT EDGE REGION | −1 | −1 | −1 | −1 | −1 | −1 | −1 | −1 | 1 | 1 | 1 | 1 | 1 | 1 | 1 | 1 |
| RIGHT EDGE REGION | 1 | 1 | 1 | 1 | 1 | 1 | 1 | 1 | −1 | −1 | −1 | −1 | −1 | −1 | −1 | −1 |
| 3 LEFT EDGE REGION | 1 | 1 | 1 | 1 | 1 | 1 | 1 | 1 | −1 | −1 | −1 | −1 | −1 | −1 | −1 | −1 |
| RIGHT EDGE REGION | −1 | −1 | −1 | −1 | −1 | −1 | −1 | −1 | 1 | 1 | 1 | 1 | 1 | 1 | 1 | 1 |

The above method for estimating DOA is referred to as Bartlett spectrum estimation method in the prior art. In practice, the DOA estimation methods concerned in the invention are not limited to Bartlett spectrum estimation method; other methods that can estimate the DOA are all applicable for the invention.

Step 403: Resequencing the users in the order of the arrival wave angles from big to small, according to the DOA estimation of the user. Thus, the arrival wave angles of the users after resequencing will meet the following requirement:

$$|\phi^{(1)}| \geq |\phi^{(2)}| \geq \ldots \geq |\phi^{(K)}|$$ (Formula 6)

Step 404: Selecting a user according to the order of arrival wave angles from big to small.

Step 405: Determining the region to which the user pertains according to the arrival wave angle of the user.

First of all, a positive edge threshold $\phi_0$ is set. In fact, this threshold is a threshold for dividing edge regions during network planning. It is hypothesized that the direction of the sector center is 0°, the edge threshold $\phi_0$ is 30°, then the directions of the left and right boundaries are −30° and 30° respectively. The region to which a user pertains is determined according to the obtained user DOA:

$$\begin{cases} \varphi^{(k)} \geq \varphi_0 & \text{User lies in the right edge region} \\ & \varphi^{(k)} \in \Theta_R \\ \varphi^{(k)} \leq -\varphi_0 & \text{User lies in the left edge region} \\ & \varphi^{(k)} \in \Theta_L \\ \text{else} & \text{User lies in the central region of the sector} \\ & \varphi^{(k)} \in \Theta_C \end{cases}$$ (Formula 7)

$$k = 1, \ldots, K$$

Referring to FIG. 3, it can be seen that: if the DOA of a user is larger than or equal to 30°, then the user lies in the right edge region of the sector; if the DOA of a user is less than or equal to −30°, then the user lies in the left edge region of the sector; Else, the user lies in the central region of the sector.

Step 406: Determining whether the user lies in an edge region, if yes, then turn to Step 407; otherwise, turn to Step 408.

Step 407: Allocating a channelization code to the user based on the channelization code priority table, i.e., the above Table 3 in the present embodiment, according to the edge region in which the user exists, and then turning to Step 409.

Step 408: Allocating a channelization code to the user according to the existing method for allocating channelization codes, i.e., at random or in the order of serial numbers of the channelization codes.

Step 409: Determining whether there are users still not selected; if yes, then turn to Step 404 and select the next user according to the arrival wave angle; otherwise, return to Step 401.

In the present embodiment, it is hypothesized that there are 8 users in each sector currently, and each user occupies 1 code channel. The angle of each user is shown as in Table 4.

TABLE 4

| | | User serial number | | | | | | | |
|---|---|---|---|---|---|---|---|---|---|
| Angle | | 1 | 2 | 3 | 4 | 5 | 6 | 7 | 8 |
| User Angle | Sector 1 | 46.9 | 44.2 | 41.7 | −30.9 | −30.6 | 15.9 | −10.7 | −6.8 |
| | Sector 2 | −55.6 | −49.5 | −46.3 | 43.3 | −19.8 | −12.7 | −10.7 | −7.3 |
| | Sector 3 | −58.4 | 54.3 | 44.0 | −42.5 | 30.6 | 28.9 | 27.7 | 2.8 |

It can be known from $\phi_0=30°$ that: the $1^{st}$, $2^{nd}$, $3^{rd}$, $4^{th}$ and $5^{th}$ user of Sector 1, the $1^{st}$, $2^{nd}$, $3^{rd}$ and $4^{th}$ user of Sector 2 and the $1^{st}$, $2^{nd}$, $3^{rd}$, $4^{th}$ and $5^{th}$ user of Sector 3 lie in the two edge regions of their own sector, so a channelization code needs to be allocated to these users; while the $6^{th}$, $7^{th}$ and $8^{th}$ user of Sector 1, the $6^{th}$, $7^{th}$ and $8^{th}$ user of Sector 2 and the $6^{th}$, $7^{th}$ and $8^{th}$ user of Sector 3 lie in the central region of the respective sector, so a channelization code can be allocated to these users according to the prior art.

Thus, the allocation result is shown as in Table 5.

TABLE 5

| Angle and channelization code allocation | | User serial number | | | | | | | |
|---|---|---|---|---|---|---|---|---|---|
| | | 1 | 2 | 3 | 4 | 5 | 6 | 7 | 8 |
| User Angle | Sector 1 | 46.9 | 44.2 | 41.7 | −30.9 | −30.6 | 15.9 | −10.7 | −6.8 |
| | Sector 2 | −55.6 | −49.5 | −46.3 | 43.3 | −19.8 | −12.7 | −10.7 | −7.3 |
| | Sector 3 | −58.4 | 54.3 | 44.0 | −42.5 | 30.6 | 28.9 | 27.7 | 2.8 |
| Channelization code used for channelization code allocation | Sector 1 | 12 | 15 | 13 | 6 | 4 | 1 | 3 | 11 |
| | Sector 2 | 11 | 14 | 9 | 6 | 10 | 1 | 7 | 15 |
| | Sector 3 | 3 | 12 | 14 | 4 | 15 | 11 | 10 | 9 |

In Table 5, since the channelization code of a user is allocated according to the priority of the channelization code, and the priority table of the channelization codes is determined according to the correlation coefficient table of the spread spectrum codes of two adjacent sectors, wherein the channelization codes of two adjacent sectors whose corresponding spread spectrum codes have small correlation coefficient are set to have high priority and the channelization codes whose corresponding spread spectrum codes have large correlation coefficient are set to have low priority. By allocating channelization codes according to the above method, it can be ensured that the correlation coefficient between the spread spectrum codes generated according to the channelization codes allocated to users in adjacent edge regions of the adjacent cells is small, so that it can be ensured that the spread spectrum code interference of users in adjacent edge regions of the adjacent cells is small.

For example, in Table 5, the arrival wave angles of users 1, 2 and 3 in sector 1 are larger than 30°, so these users lie in the right edge region of sector 1. It can be seen from FIG. 3 that the left edge region of sector 3 is adjacent to the region. The arrival wave angles of users 1, 4 are less than −30°, so these users lie in the left edge region of sector 3. According to the correlation coefficient table of spread spectrum codes corresponding to sector 1 and sector 3, i.e., Table 2-2, and the channelization code priority table, i.e. Table 3, channelization codes 12, 15 and 13 selected from channelization codes 9-16 with a priority of 1 are allocated to users 1, 2 and 3 in sector 1; and channelization codes 3 and 4 selected from channelization codes 1-8 with a priority of 1 are allocated to users 1 and 4 in sector 3. Thus, it can be ensured that the correlation coefficient between the spread spectrum codes generated according to the channelization codes allocated to users 1, 2 and 3 in sector 1 and users 1 and 4 in sector 3 is small, so that it may be ensured that the interference between the spread spectrum codes of users 1, 2 and 3 in sector 1 and users 1 and 4 in sector 3 is small.

Additionally, in the present embodiment, the channelization codes corresponding to the spread spectrum codes used in the common channel may be further allocated during channelization code allocation according to the priority of each channelization code in the edge region of each sector.

In the present embodiment, the location of a user is determined by receiving an arrival wave signal from the user and computing the DOA of the user, wherein DOA is a kind of user location information. In practical application, the sector region in which a user exists may be determined with other location information.

It can be seen from the above embodiments that in the method for allocating channelization codes in a CDMA system according to the invention, same-frequency interference at the sector edge caused by the correlativity of spread spectrum codes can be lowered, and the communication quality of a user at the sector edge can be improved.

The invention claimed is:

1. A method for allocating channelization codes in a CDMA (Code Division Multiple Access) system, comprising:
   A. computing spread spectrum codes allocable in each sector according to a cellization code and a channelization code that are allocated to each sector during the network planning of a CDMA system, computing the correlativity between spread spectrum codes of adjacent sectors, and obtaining a correlation coefficient between the spread spectrum codes allocable in each pair of adjacent sectors;
   B. performing region division on each sector, and marking out the edge region of each sector;
   C. determining a priority of each channelization code corresponding to the spread spectrum code of each adjacent sector in the edge region of each sector, according to the correlation coefficient between the spread spectrum codes allocable in each pair of adjacent sectors;
   D. computing a location information of a user by the system in real time during the operation of the CDMA system, and determining to which region of the sector the user pertains according to the location information; and
   E. allocating a channelization code to each user by the system according to the region to which each user pertains and the priority of each channelization code in the edge region of each sector determined in step C.

2. The method for allocating channelization codes according to claim 1, wherein the cellization code is a scrambling code; and computing spread spectrum code allocable in each sector in step A is as follows:
   obtaining the spread spectrum code allocable in each sector by bit-multiplying the allocated scrambling code of each sector with all the allocable channelization codes.

3. The method for allocating channelization codes according to claim 1, wherein computing the correlativity between spread spectrum codes of adjacent sectors, and obtaining a correlation coefficient between the spread spectrum codes allocable in each pair of adjacent sectors in step A is as follows:

$$\rho^{(l_1,l_2,q_1,q_2)} = \left| \frac{1}{Q} \sum_{m=1}^{Q} s^{(l_1,q_1)}(m) s^{(l_2,q_2)}(m) \right|$$

$$l_1, l_2 = 1, \ldots, L; q_1, q_2 = 1, \ldots, Q$$

wherein, $\rho^{(l_1,l_2,q_1,q_2)}$ is the correlation coefficient; L is the number of system sectors; Q is the number of channelization codes; $S^{(l_1,q_1)}(m)$ is the spread spectrum code allocable in one of the two adjacent sectors; $S^{(l_2,q_2)}(m)$ is the spread spectrum code allocable in the other of the two adjacent sectors.

4. The method for allocating channelization codes according to claim 1, wherein the method of performing region division on each sector in step B is as follows:
   setting an edge angle threshold, wherein the region that deviates from the sector center in the left in excess of the angle threshold is referred to as the left edge region of the sector; and the region that deviates from the sector center in the right in excess of the angle threshold is referred to as the right edge region of the sector.

5. The method for allocating channelization codes according to claim 4, wherein the method of computing the location information of a user by the system in real time in step D is as follows:
   receiving an arrival wave signal sent by a user via the system and computing the power angular spectrum of the arrival wave signal, wherein the angle on which the maximum power of the arrival wave signal exists is the location information of the user; and
   the method of determining to which region of the sector the user pertains in step D is as follows: determining whether the angle on which the maximum power of the arrival wave signal exists is in a region that deviates from the sector center in the left in excess of an angle threshold, or in a region that deviates from the sector center in the right in excess of an angle threshold; if yes, then the user is in the left edge region or the right edge region of the sector; otherwise, the user is in the center region of the sector.

6. The method for allocating channelization codes according to claim 1 or 5, wherein:
   the step D further comprises the step of sequencing the users from far to near according to the distances of the users from the sector center; and
   in the step E, the system allocates a channelization code to each user one by one according to the sequence of the users.

7. The method for allocating channelization codes according to claim 1, wherein:
   the step A further comprises the step of recording the obtained correlation coefficients between the spread spectrum codes allocable in each pair of adjacent sectors in a correlation coefficient table of the spread spectrum codes in the adjacent sector;

the method of determining the priority of each channelization code in the edge region of each sector in step C is as follows:

selecting channelization codes corresponding to a set of spread spectrum codes with small correlation coefficient from the correlation coefficient table of the spread spectrum codes in the adjacent sectors, and setting the priority thereof as high priority; and setting the priority of the channelization codes corresponding to a set of spread spectrum codes with large correlation coefficient as low priority.

8. The method for allocating channelization codes according to claim 7, wherein the method of determining the priority of each channelization code in the edge region of each sector in step C further comprises:

setting the priority of a same channelization code as different in the two edge regions of the same sector; and in the edge regions of one sector, if some channelization codes are set as high priority, then the rest channelization codes will be set as low priority.

9. The method for allocating channelization codes according to claim 8, wherein the process of determining the priority of each channelization code in the edge region of each sector in step C comprises the steps of:

C1. selecting two adjacent sectors from all of the sectors, and determining the adjacent edge regions of the two sectors;

C2. selecting channelization codes corresponding to a set of spread spectrum codes with small correlation coefficient from the correlation coefficient table of the spread spectrum codes in the two adjacent sectors, and setting the priorities of these channelization codes in the adjacent edge regions of the two sectors as high priority; and setting the priorities of these channelization codes in non-adjacent edge regions of the two sectors as low priority, according to the principle that the same channelization code has a high priority only in one edge region of a sector and has a low priority in the other edge region of the same sector;

C3. selecting channelization codes corresponding to a set of spread spectrum codes with large correlation coefficient from the correlation coefficient table of the spread spectrum codes in the two adjacent sectors, and setting the priorities of these channelization codes in the adjacent edge regions of the two sectors as low priority; and setting the priorities of these channelization codes in the non-adjacent edge regions of the two sectors as high priority, according to the principle that the same channelization code has a high priority only in one edge region of a sector and has a low priority in the other edge region of the same sector;

C4. selecting a sector adjacent to one of the above sectors of which the priority has been set, and determining the edge region of the selected sector, which is adjacent to the sector of which the priority has been set;

C5. according to the correlation coefficient table of the spread spectrum codes in the selected sector and the sector of which the priority has been set, and the channelization codes with high priority in the edge region in the sector of which the priority has been set, determining the channelization codes of the selected sector corresponding to the spread spectrum codes having small correlation coefficient with the spread spectrum codes corresponding to the channelization codes with high priority; setting the priorities of these channelization codes in the adjacent edge regions of the selected sector and the sector of which the priority has been set as high priority, and setting the priorities of these channelization codes in the non-adjacent edge regions of the selected sector and the sector of which the priority has been set as low priority, according to the principle that the channelization codes only have a high priority in one edge region of the sector;

C6. selecting the channelization codes corresponding to a set of spread spectrum codes with large correlation coefficient and the priority of which is not determined in step C5 from the correlation coefficient table of the spread spectrum codes in the two adjacent sectors, according to the correlation coefficient table of the spread spectrum codes in the selected sector and the sector of which the priority has been set, and setting the priorities of these channelization codes as low priority; and setting the priorities of these channelization codes in the non-adjacent edge regions of the selected sector and the sector of which the priority has been set as high priority, according to the principle that the channelization codes only have a low priority in one edge region of the sector; and C7. repeating steps C4 to C6 if there are sectors of which the priorities are not set, until the priorities of all the sectors are set.

10. The method for allocating channelization codes according to claim 1 or 7, wherein:

the step C further comprises: for the spread spectrum codes of the current sector having large correlation coefficient with the spread spectrum codes used in a common channel in adjacent sectors for sending omnidirectionally, the priorities thereof in the corresponding edge regions are set as low priority; and the step E further comprises: allocating the channelization codes corresponding to the spread spectrum codes used in the common channel according to the priority of each channelization code in the edge region of each sector.

11. The method for allocating channelization codes according to claim 1, wherein the step E comprises the steps of:

allocating channelization code by the system to the user in an edge region according to the priority of each channelization code in the edge region of each sector determined in step C; and allocating channelization code to the user outside the edge region at random or according to the serial number of the channelization code.

* * * * *